United States Patent [19]

Lochte

[11] 4,114,928
[45] Sep. 19, 1978

[54] HIGH FORCE CONNECTING MECHANISM

[75] Inventor: Glen E. Lochte, Cypress, Tex.

[73] Assignee: FMC Corporation, San Jose, Calif.

[21] Appl. No.: 758,225

[22] Filed: Jan. 10, 1977

[51] Int. Cl.² .................................................. F16L 21/08
[52] U.S. Cl. .................................... 285/18; 285/309; 285/403
[58] Field of Search ............... 285/310, 309, 308, 404, 285/403, 311, 18

[56] References Cited

U.S. PATENT DOCUMENTS

| | | | |
|---|---|---|---|
| 3,129,774 | 4/1964 | Armstrong | 166/0.6 |
| 3,155,401 | 11/1964 | Musolf | 285/309 X |
| 3,228,715 | 1/1966 | Neilon et al. | 285/317 X |
| 3,271,053 | 9/1966 | Kurachi | 285/317 X |
| 3,321,217 | 5/1967 | Ahlstone | 285/18 |
| 3,338,596 | 8/1967 | Knox | 285/321 X |
| 3,521,911 | 7/1970 | Hanes et al. | 285/27 |
| 3,827,728 | 8/1974 | Hynes | 285/309 X |

FOREIGN PATENT DOCUMENTS

| | | | |
|---|---|---|---|
| 808,000 | 3/1969 | Canada | 285/308 |
| 1,421,921 | 11/1965 | France | 285/310 |

*Primary Examiner*—Thomas F. Gallaghan
*Attorney, Agent, or Firm*—W. W. Ritt, Jr.; J. F. Verhoeven; C. E. Tripp

[57] ABSTRACT

An inner conduit is received in an outer conduit in overlapping relationship. A locking member is received in the outer conduit for lateral shifting into locking engagement with the inner conduit. There are two spaced apart abutment surfaces on the outer conduit, and a toggle member is received in the outer conduit. When the toggle member is expanded, a clamping force is exerted from one of said abutment surfaces to the other through the locking member and the inner conduit, to hold the conduit members tightly together. The locking member and the toggle member can be operated by manual screws, or by a piston powered cam. Seals can be inserted between the inner and outer conduits to establish a fluid-tight seal.

14 Claims, 9 Drawing Figures

FIG_9

FIG_7

FIG_8

HIGH FORCE CONNECTING MECHANISM

BACKGROUND OF THE INVENTION

1. Field of the Invention

This application relates to connecting mechanism particularly suitable to connect fluid conducting members in completion systems for oil or gas wells.

2. Description of the Prior Art

It is common in oil well completion systems to connect one pipe or casing to another in end-to-end relation. Generally, the two members are joined in overlapping relation, and a locking member is received in one for engagement with the other. Such a construction is shown, for example, in the U.S. Pat. to Ahlstone No. 3,321,217. As shown in that patent, the locking member is urged radially inwardly, into tight locking engagement, by a piston-powered wedge ring. While the wedge ring is effective to force the locking member into engagement with the inner pipe, it does not serve to force the inner pipe into clamped relationship with the outer pipe.

SUMMARY OF THE INVENTION

In the present invention, a first member (which may, for example, be the outer conduit member in an oil well completion system) has two spaced apart abutment surfaces. A second member (which may, for example, be the inner pipe in an oil well completion system) is received in overlapping relationship with the first member. A shiftable locking member (which may, for example, be slidably received in the outer member for lateral movement) has a locking position in bridging relationship with the first and second members to hold said members together. A toggle, which is mounted in the first member, is operable when expanded to exert a clamping force from one of the abutment surfaces to the other abutment surface through the locking member and the second member.

The locking member and the toggle member can be actuated manually, through screws, or hydraulically through a driven piston. Seals can be provided to form a fluid-tight seal between the members.

The two abutment surfaces on the first member act as jaws of vice, and the toggle member serves to urge the second member into firm, tight engagement with one of said surfaces, therefore urging the second member into firm tight engagement with the first member.

It is therefore one object of the present invention to urge two overlapping members into firm engagement with each other.

It is another object of the present invention to firmly lock two conduits in end-to-end relation.

It is still another object of the invention to urge one conduit into an abutment surface on another conduit.

DESCRIPTION OF THE PREFERRED EMBODIMENTS

Figure 1:
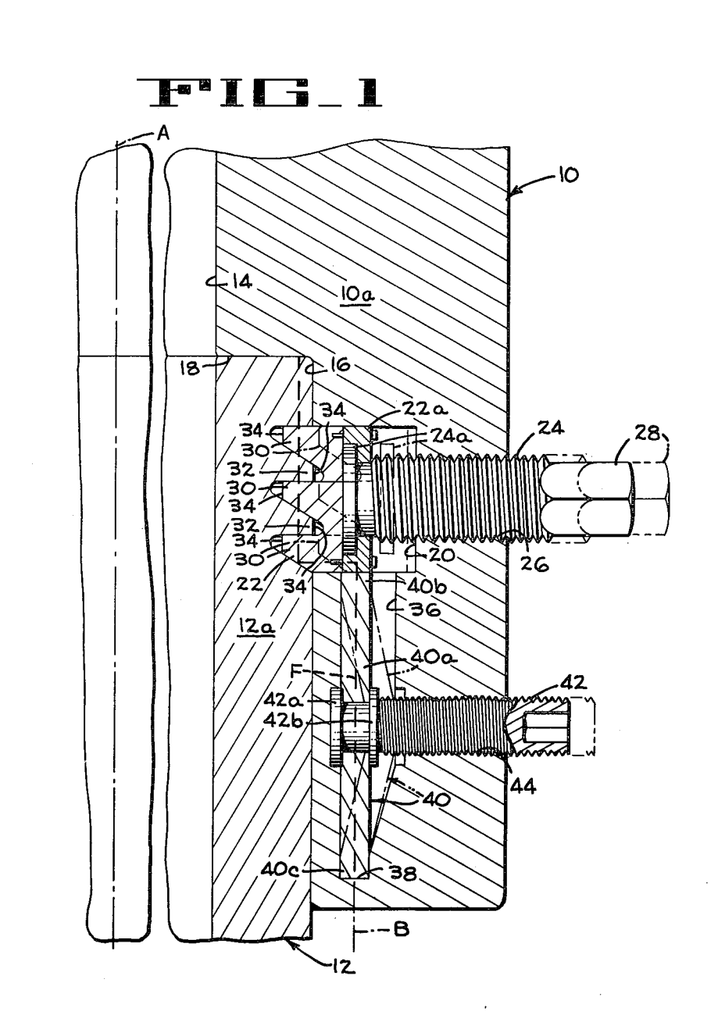
FIG. 1 is a view in cross-section of one embodiment of the present invention.

There is shown in FIG. 1 a first member 10 and a second member 12 which are joined in overlapping relationship. The two members can be any two overlapping members, such as an outer member with an opening and an inner member received in said opening. The mechanism of the present invention is particularly suitable for joining two elongated conduit members (as might, for example, be used in an oil or gas well drilling and completion system) in end-to-end relationship. As used herein, the term conduit is intended to include casing, tubing, pipe or other oil or gas drilling fluid conveying members, and the term conduit members is intended to include any conduit, casing, tubing, pipe or the like either by itself or in combination with a fitting, hub or other coupling member. In the embodiment of FIG. 1, the conduit members 10 and 12 are concentric conduits with fittings 10a and 12a, both conduit members having the common central longitudinal axis A. At the zone of overlap, the member 12 is received in the member 10 and, for convenience, the members may be referred to as inner member and outer member, respectively.

The conduit member 10 has a first cylindrical opening, or bore 14, and, coaxial therewith, a second cylindrical opening, or bore, 16 which is an extension of the adjoining first bore 14 and larger than said bore. The juncture of the first bore and second bore defines a shoulder 18 in the first conduit member 10. For reasons which will be discussed more fully hereinafter, the shoulder 18, which is annular in configuration, may be referred to as a first abutment surface.

An annular groove 20 is cut in the surface of the bore 16 below the shoulder 18. A split resilient ring 22, having a diameter in the relaxed state greater than groove 20, is received in the groove. Screws 24 have flat pads 24a thereon which are embraced by a removable flange 22a of ring 22 with sufficient looseness to permit rotation of the screw 24 and pad 24a relative to the ring. The screws are received in threaded holes 26 which extend from the groove 20 to the outer surface of the first member 10. The screws have heads 28 beyond the outer surface of the member 10 for receipt of a tool thereon.

The inner surface of ring 22 has teeth 30 which engage with teeth 32 on the outer surface of inner member 12. When the screws 24 are moved outwardly, by rotation of head 28, (to the position shown in dotted lines), the resilient ring expands to disengage the teeth 30 thereof from the teeth 32 of the inner member 12, and the member 12 can be released from the outer member 10. Conversely, when the screws 24 are moved inwardly by a reverse rotation of head 28, the resilient ring is contracted to engage the teeth 30 thereof with the teeth 32 of the inner member 12. It will be noted that the lower surface of teeth 30 and the upper surface of teeth 32 are tapered, and the ends of both teeth truncated as at 34, so that the teeth of the ring make firm engagement with inner member 12. Moreover, the upper surfaces of teeth 30, and the lower surfaces of teeth 32, are substantially horizontal (and parallel to shoulder 18) for reasons to be discussed hereinafter.

It should be noted at this time that a series of separate dogs (each identical to a short segment of ring 22) rotatably connected to the screws 24 could be utilized instead of the continuous ring 22. If this were done, the annular groove 20 could, be a plurality of pockets cut into the surface of bore 16.

A deep, vertical annular chamber 36, which communicates at its upper end with groove 20, is formed in the outer member 10 around axis A. The bottom surface 38 of the chamber 36, which is annular in configuration, constitutes a second abutment surface in member 10, parallel to the first abutment surface 18 of that member. An annular toggle member 40, which, in its normal state, bulges outwardly in its center portion 40a (as shown in dotted lines), is received in chamber 36. The upper portion 40b of the toggle element lies in a vertical plane B and the upper surface of the element is adjacent the bottom of ring 22. The lower portion 40c of the toggle element lies in the vertical plane B and engages the abutment surface 38. Actuating screws 42 are received in threaded holes 44 extending from chamber 36 to the outer surface of member 10. The inner end of the screws have spaced apart collars 42a, 42b secured thereon which engage the center portion of the toggle member 40. Rotation of the screws expands the vertical span of the toggle member by forcing the center portion 40a into plane B, as shown in solid lines in FIG. 1. Outward movement of the screws by rotation thereof, will withdraw the center portion of the toggle member from plane B to the normal position shown in dotted lines in FIG. 1.

Prior to assembly of inner and outer conduit members 10 and 12, the screws 28 and 42 are engaged in member 10 but in their outer positions so that ring 22 is expanded in groove 20 and toggle 40 is in its contracted position. Conduit member 12 is then inserted into conduit member 10, and screw 28 moved in to contract ring 22 and engage teeth 30 thereof with the teeth 32 of member 12. The engagement of the teeth is firm, but large forces radial with respect to axis A are not exerted to force the teeth of the respective members together. Instead, the screw 42 is moved in, straightening the toggle 40 to increase the longitudinal span thereof.

It should be noted that three members are in contact (and in force transfer relationship) between the two abutment surfaces 18 and 38, which are fixed surfaces on conduit member 10. The three members are: the toggle member 40 having a lower surface engaged with surface 38 and an upper surface engaged with the lower surface of ring 22; the ring 22 having a lower surface engaged with the upper surface of the toggle and upper teeth surfaces engaged with lower teeth surfaces of conduit member 12; and inner conduit member 12 having lower teeth surfaces engaged with the upper teeth surfaces of ring 22 and having an upper surface engaged with abutment surface 18. The expansion of the toggle 40, which is engaged with abutment surface 38, creates a large force because of the confinement of the toggle, the ring 22, and a portion of inner conduit 12, between the two abutment surfaces 38 and 18. It will be noted that the contacting surfaces of the teeth 30 and 32 through which the force generated by the toggle is transmitted are substantially horizontal, so that no significant force lateral to axis A is created by the engaging teeth.

Thus, when the toggle is expanded, a very large force is transferred upward (as indicated by force transfer line F) from surface 38, through toggle 40, ring 22, a portion of member 12 to abutment surface 18. Consequently, member 12 is held tightly clamped against shoulder 18, and a high preloading force is produced at the juncture of elements 10 and 12. The force created by the toggle and directed through ring 22 and member 12 to the shoulder 18 eliminates any looseness in the joint, and the magnitude of the preloading created by that force reduces the possibility of fatigue failure at the joint and internal wear.

Figure 2:
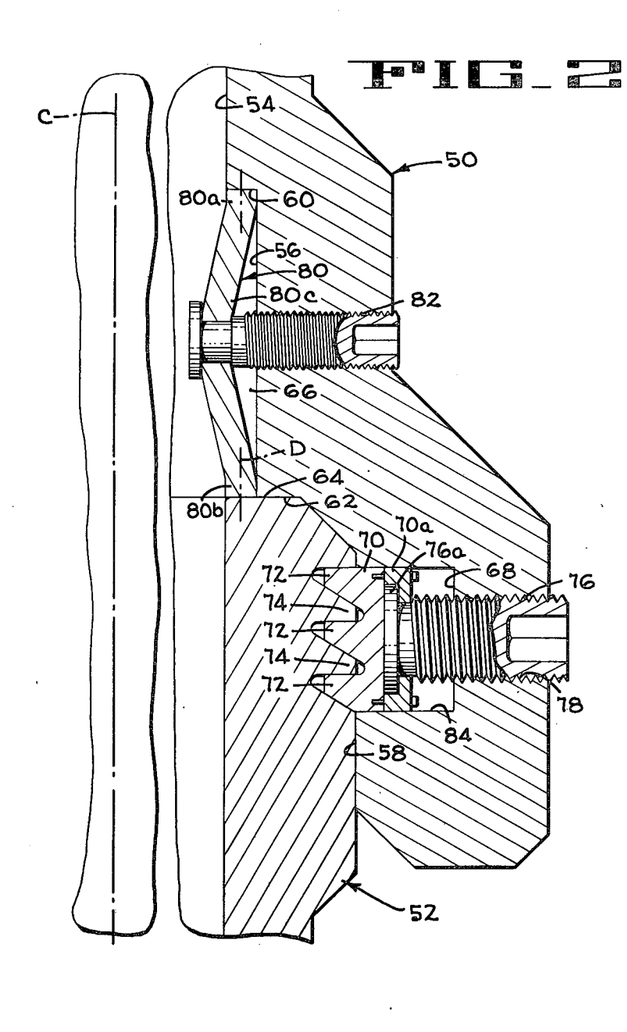
FIG. 2 is a view in cross-section of another embodiment of the present invention.

In the embodiment of FIG. 2, the outer conduit member 50 and the inner conduit member 52, each having a central longitudinal axis C, are joined in overlapping, coaxial, end-to-end relationship. The outer conduit member 50 has three progressively larger bore portions: a first bore portion 54, a second bore portion 56, and a third bore portion 58. A first shoulder 60 is formed at the juncture of the first and second bore portions and a second shoulder 62 is formed at the juncture of the second and third bore portions. The inner conduit member 52 is received in bore 58 of member 50, with the upper surface 64 of member 52 engaged with the shoulder 62. When the inner member 52 is received in bore 58, the inner surface of member 52 extends inside of bore 56 of outer member 50, so that a groove 66 in member 50 is defined by shoulder 60, bore 56, and upper surface 64 of inner member 52. A groove 68 is also formed in outer member 50 in which a plurality of circumferentially spaced dogs 70 are received.

The dogs 70 have teeth 72 which engage with teeth 74 on the outer surface of inner member 52. The lower surfaces of teeth 72, and the upper surfaces of teeth 74, are tapered, while the upper surfaces of teeth 72 and the lower surfaces of teeth 74 are substantially horizontal. A screw 76 for each dog 70 has a pad 76a retained by removable flange 70a of the dog. The screw 76 is received in a threaded hole 78 communicating with chamber 68 and can be turned from outside the outer member 50 to advance and retract the dog 70.

An annular toggle member 80, having end portions 80a, 80b lying an axis D, has a center portion 80c which can bulge inwardly. A screw 82 has a shoulder and a collar spaced therefrom at one end to rotatably engage the center portion of the toggle. The outer end of the screw is engaged in a threaded hole passing through the outer member 50. The toggle member 80 can be expanded and contracted by movement of the screw 82 (which can be rotated from outside the outer member) outwardly and inwardly.

In this embodiment of the invention, the shoulder 60 constitutes a first abutment surface in the outer member, and the bottom surface 84 of the groove 68 constitutes the second abutment surface in the outer member. Sandwiched between these abutment surfaces, in a substantially vertical line of force, are the three members: dogs 70, inner member 52, and the expandable toggle 80. When the inner member is in the position shown in FIG. 2, and the toggle 80 is expanded, a very large force is transmitted from one abutment surface to the other through the dogs, inner member, and toggle member to join the inner member and outer member tightly. In this specific embodiment, the inner member is forced down by the toggle into the substantially horizontal upper surfaces of the teeth 72. The dogs are, in turn, forced into engagement with the second abutment surface 84.

Figures 3, 4:
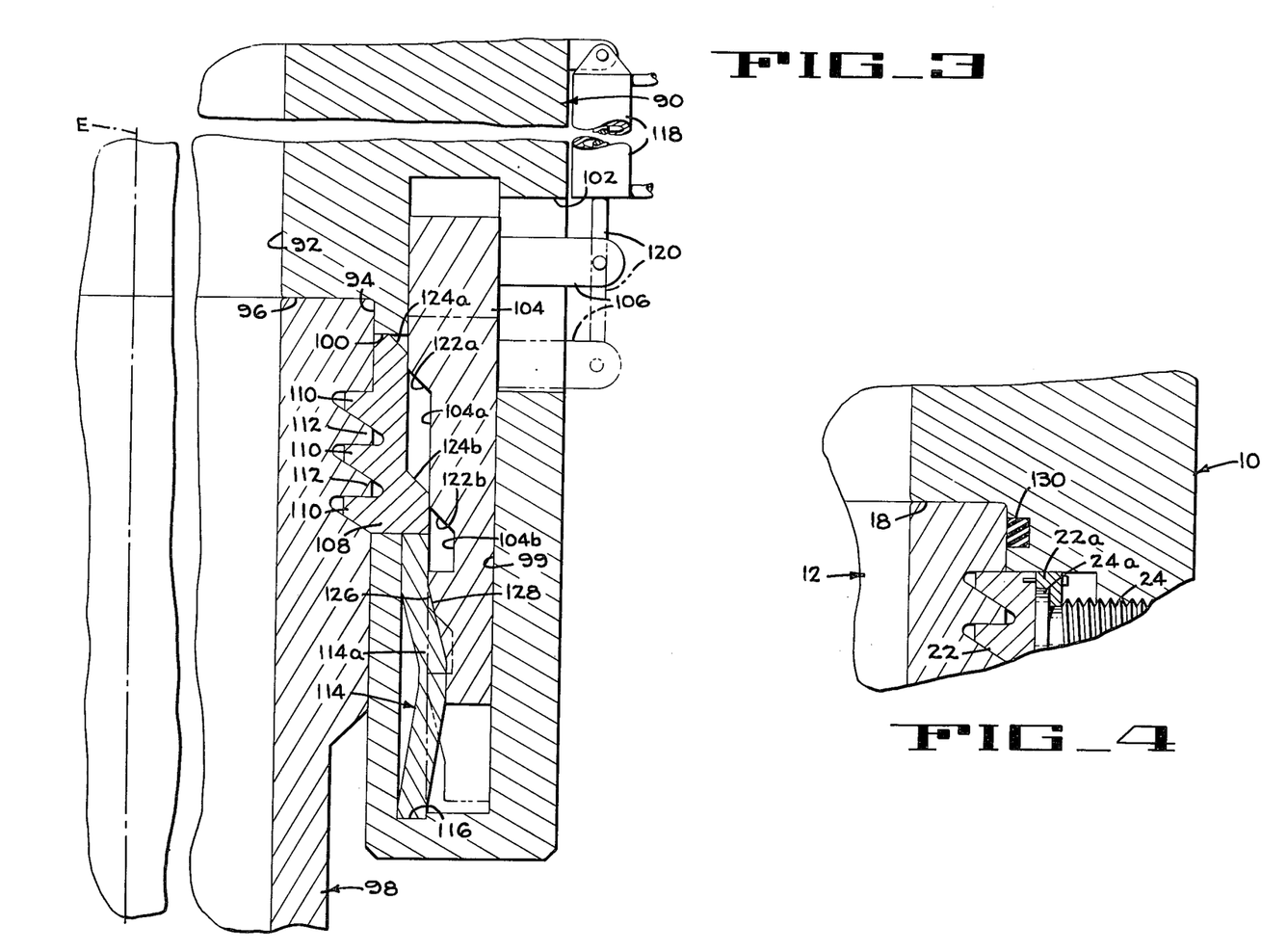
FIG. 3 is a view in cross-section of yet another embodiment of the present invention.
FIG. 4 is a fragmentary view in cross-section of still another embodiment of the present invention.

In another embodiment of the invention shown in FIG. 3, the outer conduit member 90 has a first bore portion 92 and a second bore portion 94 with a common central axis E. A shoulder 96 is formed at the juncture of the bores. The inner member 98, having a central axis on axis E, is received in the outer member, and has an upper surface which abuts against the shoulder 96 when the two conduit members are joined together.

The outer member 90 has a plurality of chambers 99, each with an inner opening 100 and an outer opening 102. A cam 104 is received in each of the chambers 99, and each cam has a bracket 106 extending through the outer opening 102. A dog 108 is received in the inner opening 100 and has teeth 110 engaged with the teeth 112 of the inner conduit member 98. As in previous embodiments, the upper surface of the teeth 110 of the dog, and the lower surfaces of the teeth 112 of the inner member, are substantially horizontal, while the opposite surfaces of the teeth of the members are tapered.

A toggle member 114 is received in each chamber 98, with the lower surface thereof seated on an abutment surface 116 in the chamber and the upper surface thereof engaging the lower surface of the dog 108.

Each cam is operated by a hydraulic cylinder 118, secured to the outer surface of the outer member and having a piston therein. The piston has a rod 120 connected to bracket 106 to raise the cam for assembly and disassembly of the inner and outer conduit members and to lower the cam for locking the conduit members together.

When the cam 104 is in its uppermost position, and the dog 108 is retracted into the recesses 104a and 104b in the cam, the inner member 98 can be inserted into the outer member 90 to the position shown in FIG. 3. As the cam is lowered from its uppermost position, the cam surfaces 122a and 122b engage the dog surfaces 124a and 124b to urge the teeth of the dog into firm engagement with the teeth of the inner conduit member. As the cam 104 continues its descent, the surface 126 thereof engages the surface 18 of the center portion 114a of toggle 114. The descending cam straightens the toggle, increasing the span thereof. Thus, a large force is generated between the abutment surface 116 and the abutment surface defined by shoulder 96, holding the inner member 98 tightly against the shoulder 96 of the outer member.

It will be understood that seals can be provided between the inner member and the outer member of each embodiment disclosed to increase the fluid-tightness of the connection between these members. By way of example, a seal 130 can be installed in the outer member 10 of FIG. 1, as shown in FIG. 4, to prevent fluid from escaping through the juncture of the inner and outer members.

Figure 5:
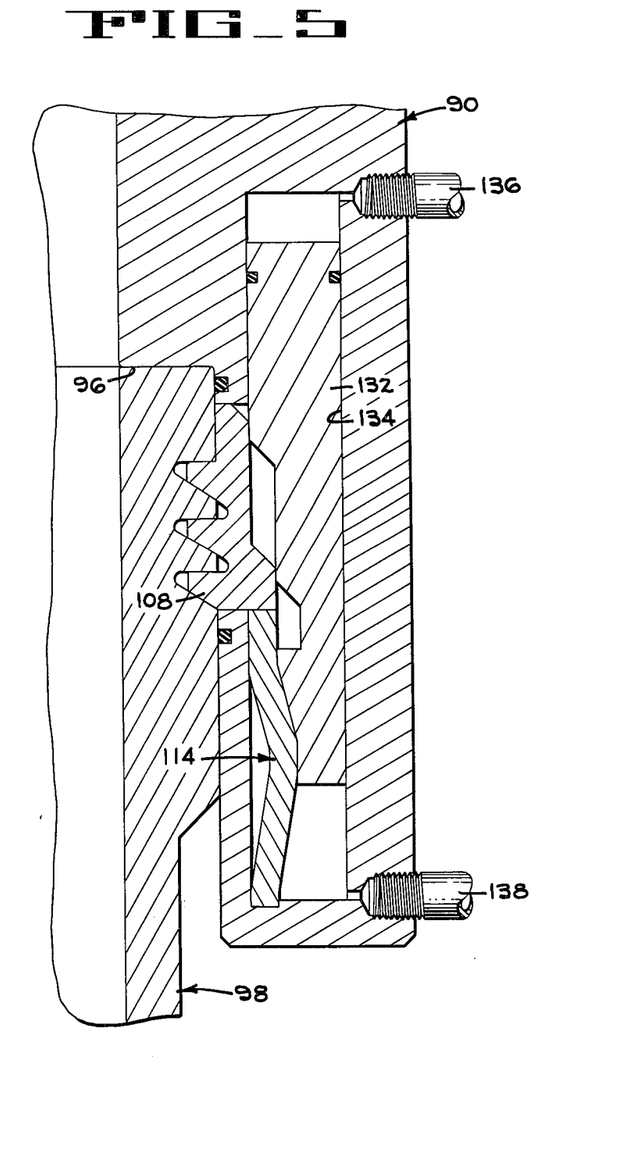
FIG. 5 is a view in cross-section of still another embodiment of the present invention.

It should also be noted, as shown in FIG. 5, that, in a system of the type shown in FIG. 3, an annular cam 132 can be received in an annular chamber 134 for vertical movement in the chamber. Instead of a separate cylinder and piston motor on the outer surface of the outer member, as shown in FIG. 3, the annular chamber 134 and annular cam 132 can function in the same manner as a cylinder and piston on the introduction of fluid into chamber 134 alternatively through a first motor line 136 and a second motor line 138.

Figure 6:
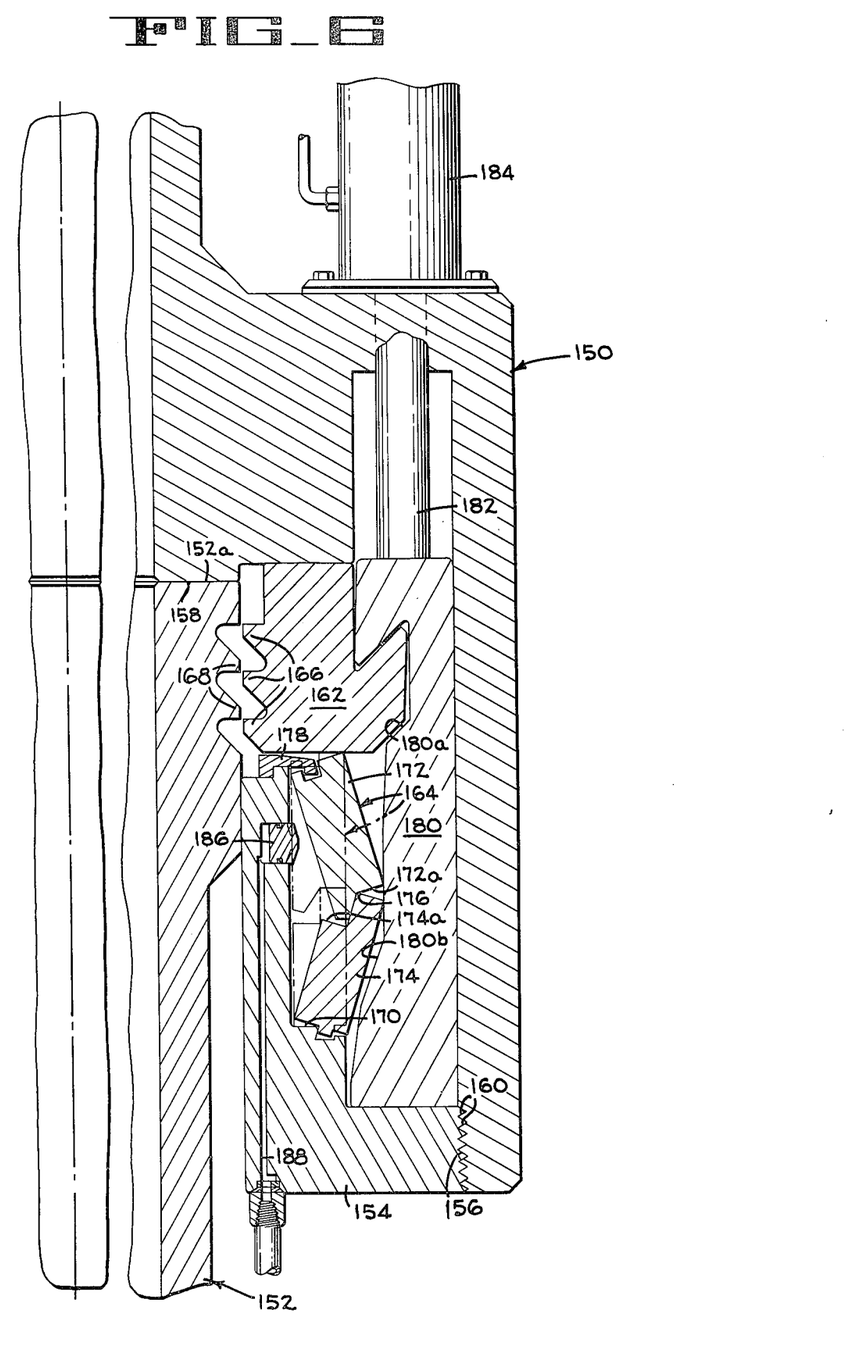
FIG. 6 is a view in cross-section of another embodiment of the present invention.

In the embodiment of FIG. 6, the outer conduit member 150 is in overlapping relation to an inner conduit member 152 which is slidably received in an annular fitting 154. The fitting 154 is threadedly engaged at 156 with the outer member 150.

A horizontal surface 158 defines a first abutment surface on member 150 and the upper surface 160 of the screw threads at 156 defines a second abutment surface. Between these two surfaces is the upper portion of the inner member, a locking member 162, a toggle member 164, and the fitting 154.

The locking member has teeth 166 which engage with teeth 168 on the inner member 152. As in previous embodiments, the upper surface of the teeth of the locking member, and the lower surfaces of the teeth of the inner member, are substantially horizontal while the opposite surfaces of the teeth are tapered.

Figure 7:
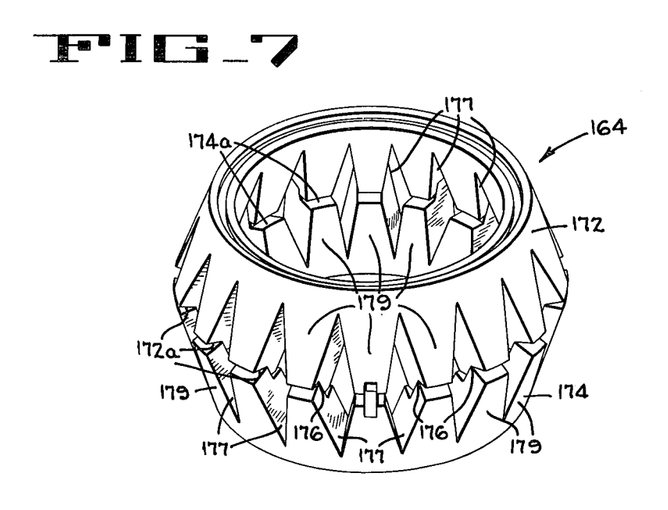
FIG. 7 is a view in perspective of the toggle member of the embodiment of FIG. 6 in a shortened position.
Figure 8:
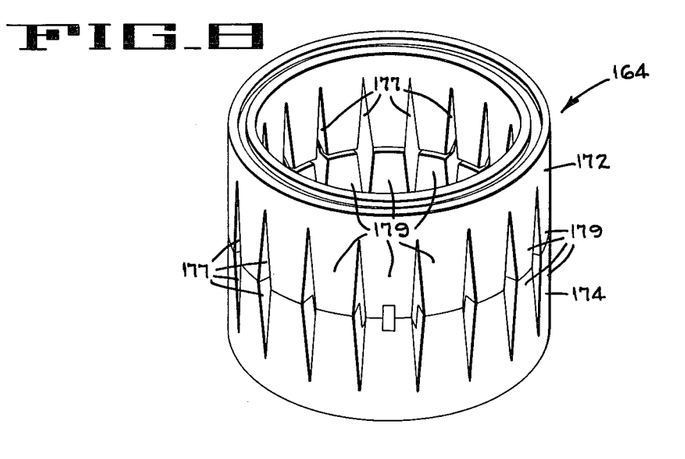
FIG. 8 is a view in perspective of the toggle member of the embodiment of FIG. 6 in a lengthened position.

The toggle member 164 is received between the locking member and a horizontal stepped surface 170 of the fitting 154. As shown best in FIGS. 7 and 8, the toggle member consists of two rings 172, 174 of a truncated, conical configuration. The rings are stepped at their inner end faces 172a, 174a for a rocking motion about a corner 176 of one of the steps. Both rings are slotted, as at 177, to form fingers 179 which spread apart when the toggle member is contracted (FIG. 7) and which come together when the toggle member is expanded (FIG. 8). An inverted U-shaped ring 178 spans the fitting 154 and the upper ring 172 of the toggle to hold the toggle upright.

An annular cam 180, which is connected to the rod 182 of a hydraulic cylinder 184, has a surface 180a to engage the locking member 162 when the cam is raised. The locking member, which is a split, resilient ring, is forced inwardly so that the teeth thereof engage with the teeth of inner conduit 152. The cam also has a surface 180b which, when the cam is raised, straightens the toggle 164 (to the position shown in FIG. 8) after the locking member 162 is engaged with the inner conduit 152. The straightening of the toggle lengthens the toggle and creates a force which urges the upper surface 152a of the inner conduit into the abutment surface 158 of the outer conduit member 150.

A piston 186, upon receipt of fluid under pressure in passage 188, urges the toggle to its shortened position (shown in FIG. 7) when cam 180 is lowered.

Figure 9:
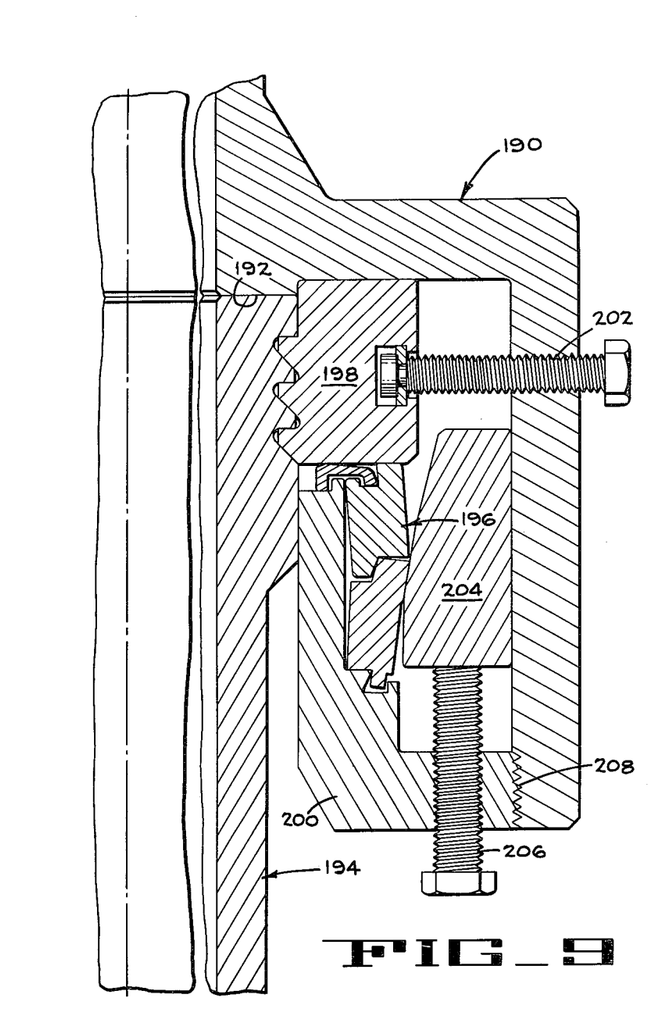
FIG. 9 is a view in cross-section of another embodiment of the present invention.

In the embodiment of FIG. 9, the outer member 190 has an abutment surface 192 against which an inner conduit member 194 (similar to conduit member 152) is urged by a toggle 196. The toggle engages a locking member 198 which is similar to locking member 162, and the toggle is supported by a fitting 200 which is similar to fitting 154. In this embodiment, however, the locking member is moved into and out of engagement with inner conduit 194 by screw 202, and the cam 204 is moved up and down by screw 206. In this embodiment, the other abutment surface on outer conduit 190 is also the upper surface of the threads 208 which hold the fitting in the outer member.

Thus, a number of embodiments of connector mechanism suitable for joining large diameter conduit members has been disclosed. The connecting mechanism has been preloaded for resistance to fatigue and to limit wear to that resulting from repetitive operation of the connecting mechanism. Although high connecting forces are generated by the connecting mechanism, the mechanism is actuated by relatively small forces.

Although the best mode contemplated for carrying out the present invention has been herein shown and described, it will be apparent that modification and departing from what is regarded to be the subject matter of the invention.

What is claimed is:

1. Clamping mechanism comprising a first member having two spaced apart abutment surfaces, a second member in overlapping relationship with said first member, a shiftable locking member having a locking position in bridging relationship with said first and second members to hold said members together, said second member and said locking member having teeth for engagement to lock said members together when said locking member is in said locking position, a toggle member mounted in said first member operable when expanded to exert a clamping force from one of said abutment surfaces to the other abutment surface through said locking member and said second member, and means to expand said toggle member.

2. The mechanism of claim 1 in which said first member is an outer conduit and said second member is an inner conduit received in the outer conduit.

3. The mechanism of claim 2 in which said outer conduit has adjoining bores to form a shoulder constituting one of said abutment surfaces and in which said inner conduit is received in said outer conduit to abut against said shoulder.

4. The mechanism of claim 2 in which said means to expand said toggle member includes a screw operable from outside said outer conduit.

5. The mechanism of claim 2 in which said means to expand said toggle member includes a hydraulically actuated cam.

6. The mechanism of claim 2 including a seal positioned in one of said conduits for engagement with the other of said conduits.

7. The mechanism of claim 1 wherein said toggle member comprises two truncated conical members.

8. The mechanism of claim 7 wherein said conical members have slots defining fingers.

9. Clamping mechanism comprising a first member having an opening therein and having two spaced apart abutment surfaces, a second member received in the opening in said first member, a locking member received in said first member for locking engagement with said second member, said second member and said locking member having engaging teeth for securing said members together into said locking engagement, and a toggle member mounted in said first member operable when expanded to exert a gripping force from one of said abutment surfaces to the other abutment surface through said locking member and said second member.

10. The mechanism of claim 9 in which said locking member comprises a split ring having teeth on the inner surface to engage the teeth on said second member.

11. The mechanism of claim 9 in which said second member has teeth on its outer surface and said locking member has teeth on its inner surface, and wherein the lower surfaces of said teeth on the second member and the upper surfaces of said teeth on the locking member are substantially horizontal for the transfer of said gripping force through the teeth of said members.

12. Clamping mechanism comprising an inner conduit member and an outer conduit member, said conduit members joinable in overlapping relationship, a locking member shiftable into bridging relationship with said inner and outer conduit members to hold said members together, said locking member and one of said conduit members having angular means engageable when said locking member is in said bridging relationship to secure said members together, two spaced apart abutment surfaces in the other of said conduit members, a toggle member mounted in force transferring relationship with said one conduit member and said locking member between said abutment surfaces, and means to expand said toggle member to clamp said conduit members together.

13. The mechanism of claim 12 wherein said toggle member comprises two truncated conical members, each with slots to define fingers.

14. Clamping mechanism comprising a first conduit member having two spaced apart abutment surfaces, a second conduit member in overlapping relationship with said first conduit member, a shiftable locking member having a locking position in bridging relationship with said first and second conduit members, said second conduit and said locking member having angular means for locking said members together when said locking member is in said locking position, a toggle member in force transfer relationship with said locking member and with a portion of said second conduit member, said toggle member, said locking member, and said portion of the second conduit member lying in a force transfer line between said abutment surfaces to tightly clamp said second conduit member to said first conduit member when the toggle is expanded, and means to expand the toggle.

* * * * *

UNITED STATES PATENT OFFICE
CERTIFICATE OF CORRECTION

Patent No. 4,114,928  Dated September 19, 1978

Inventor(s) Glen E. Lochte

It is certified that error appears in the above-identified patent and that said Letters Patent are hereby corrected as shown below:

Column 3, line 9: before "be" insert --instead,--.

Column 4, line 46: change "an" to --in--.

Signed and Sealed this

Fourth Day of December 1979

[SEAL]

Attest:

SIDNEY A. DIAMOND

Attesting Officer   Commissioner of Patents and Trademarks